(12) United States Patent
Alcalde et al.

(10) Patent No.: US 10,725,152 B2
(45) Date of Patent: Jul. 28, 2020

(54) DETECTOR DEVICE INCLUDING A SHIFTED MULTI-DIMENSIONAL ARRAY OF DETECTOR ELEMENTS

(71) Applicant: Aptiv Technologies, Limited, St. Michael (BB)

(72) Inventors: Carlos Alcalde, Beverly Hills, CA (US); Zhengzheng Li, Agoura Hills, CA (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 401 days.

(21) Appl. No.: 15/706,882

(22) Filed: Sep. 18, 2017

(65) Prior Publication Data

US 2018/0267143 A1 Sep. 20, 2018

Related U.S. Application Data

(60) Provisional application No. 62/470,942, filed on Mar. 14, 2017.

(51) Int. Cl.
*G01S 7/40* (2006.01)
*H01Q 1/32* (2006.01)
(Continued)

(52) U.S. Cl.
CPC .............. *G01S 7/4021* (2013.01); *G01S 7/03* (2013.01); *G01S 7/4972* (2013.01); *G01S 13/42* (2013.01); *G01S 13/878* (2013.01); *G01S 13/931* (2013.01); *H01Q 1/3233* (2013.01); *H01Q 21/08* (2013.01); *H01Q 21/22* (2013.01); *H01Q 25/00* (2013.01); *G01S 17/931* (2020.01)

(58) Field of Classification Search
CPC ...... G01S 13/42; G01S 13/878; G01S 13/931; G01S 17/936; G01S 7/03; G01S 7/4021; G01S 7/4972; H01Q 1/3233; H01Q 21/08; H01Q 21/22; H01Q 25/00
USPC ......................................................... 342/174
See application file for complete search history.

(56) References Cited

U.S. PATENT DOCUMENTS

2005/0012744 A1* 1/2005 Jardin ..................... G06T 15/06
345/421
2011/0298653 A1 12/2011 Mizutani et al.
(Continued)

FOREIGN PATENT DOCUMENTS

| CN | 103907242 A | 7/2014 |
| WO | 2008/073011 A1 | 6/2008 |
| WO | 2013/053467 A1 | 4/2013 |

OTHER PUBLICATIONS

English Abstract Translation of CN103907242, published Jul. 2, 2014.

*Primary Examiner* — Timothy A Brainard

(57) ABSTRACT

An illustrative example embodiment of a detector device, which may be useful on an automated vehicle, includes a multiple-dimensional array of detectors including a plurality of first detectors aligned with each other in a first direction and a plurality of second detectors aligned with each other in the first direction. The second detectors are offset relative to the first detectors in a second direction that is different than the first direction. A processor determines an interpolation coefficient related to the offset between the first and second detectors and determines an angle of detection of the device based on the interpolation coefficient.

24 Claims, 3 Drawing Sheets

(51) Int. Cl.
*G01S 13/931* (2020.01)
*G01S 7/497* (2006.01)
*H01Q 21/22* (2006.01)
*H01Q 25/00* (2006.01)
*G01S 13/87* (2006.01)
*G01S 13/42* (2006.01)
*G01S 7/03* (2006.01)
*H01Q 21/08* (2006.01)
*G01S 17/931* (2020.01)

(56) References Cited

U.S. PATENT DOCUMENTS

2013/0278457 A1 10/2013 Kamo
2016/0104946 A1 4/2016 Natsume
2017/0187102 A1 6/2017 Abe

* cited by examiner

DETECTOR DEVICE INCLUDING A SHIFTED MULTI-DIMENSIONAL ARRAY OF DETECTOR ELEMENTS

BACKGROUND

Innovations in electronics and technology have made it possible to incorporate a variety of advanced features on automotive vehicles. Various sensing technologies have been developed for detecting objects or monitoring the surroundings in a vicinity or pathway of a vehicle. Such systems are useful for parking assist, lane departure detection and cruise control adjustment features, for example.

More recently, automated vehicle features have become possible to allow for autonomous or semi-autonomous vehicle control. Sensors for such systems may incorporate LIDAR (light detection and ranging) or radar for detecting an object or another vehicle in the pathway of or otherwise near the vehicle. Depending on the approach speed, the cruise control setting may be automatically adjusted to reduce the speed of the vehicle based on detecting another vehicle in the pathway of the vehicle, for example.

One aspect of such sensing technologies includes determining an angle associated with the detection for properly identifying the position of an object external to the vehicle. With known RADAR systems, angle resolution depends on the spacing between the detector elements and the overall antenna or receiver aperture. Automotive sensing devices typically have a small number of transmit and receive channels. These considerations have made the placement of RADAR or LIDAR detector elements critical to achieve a desired level of performance.

There are challenges associated with designing and utilizing such devices on automotive vehicles. While a larger aperture size can yield better angular discrimination, it does not come without a cost. Increasing the aperture size tends to introduce grating lobes in the spectrum especially when the array spacing is greater than one-half a wavelength as demonstrated by the Nyqist-Shannon sampling theorem. Typical radar detector design includes placing the detector elements in an array with a one-half wavelength spacing between them to avoid grating lobes.

Those skilled in the art are striving to improve various aspects of detectors useful on vehicles.

SUMMARY

An illustrative example embodiment of a detector device includes a multiple-dimensional array of detectors including a plurality of first detectors aligned with each other in a first direction and a plurality of second detectors aligned with each other in the first direction. The second detectors are offset relative to the first detectors in a second direction that is different than the first direction. A processor determines an interpolation coefficient related to the offset between the first and second detectors and determines an angle of detection of the device based on the interpolation coefficient.

In an example embodiment having one or more features of the detector device of the previous paragraph, the angle of detection comprises a first angle in a first dimension and a second angle in a second dimension that is transverse with the first dimension.

In an example embodiment having one or more features of the detector device of either of the previous paragraphs, the first angle is an azimuth and the second angle is an elevation.

In an example embodiment having one or more features of the detector device of any of the previous paragraphs, the interpolation coefficient comprises a plurality of coefficients and a correction factor.

In an example embodiment having one or more features of the detector device of any of the previous paragraphs, the plurality of coefficients are coefficients of a linear relationship between the first and second detectors, there is an error in the linear relationship based on the offset between the first and second detectors, and the correction factor reduces an effect of the error.

In an example embodiment having one or more features of the detector device of any of the previous paragraphs, the offset has an associated phase difference, the error is based the phase difference, and the correction factor corresponds to a value of the phase difference that minimizes the error.

In an example embodiment having one or more features of the detector device of any of the previous paragraphs, the processor determines at least one value of the phase difference, determines when the at least one value minimizes the error and determines the plurality of coefficients from the linear relationship including the at least one value that minimizes the error.

In an example embodiment having one or more features of the detector device of any of the previous paragraphs, the first direction is perpendicular to the second direction.

In an example embodiment having one or more features of the detector device of any of the previous paragraphs, the detectors each comprise an antenna.

In an example embodiment having one or more features of the detector device of any of the previous paragraphs, the detectors detect at least one of RADAR or LIDAR radiation.

An illustrative example method of detecting includes determining an interpolation coefficient related to an offset between first and second detectors. The first and second detectors are in a multiple-dimensional array including the first detectors aligned with each other in a first direction and the second detectors aligned with each other in the first direction. The offset is between the first detectors and the second detectors in a second direction that is different than the first direction. The method includes determining an angle of detection of the device using the determined interpolation coefficient.

In an example embodiment having one or more features of the method of the previous paragraph, determining the angle of detection includes determining a first angle in a first dimension and determining a second angle in a second dimension that is transverse with the first dimension.

In an example embodiment having one or more features of the method of either of the previous paragraphs, the first angle is an azimuth and the second angle is an elevation.

In an example embodiment having one or more features of the method of any of the previous paragraphs, determining the interpolation coefficient comprises determining a plurality of coefficients and a correction factor.

In an example embodiment having one or more features of the method of any of the previous paragraphs, the plurality of coefficients are coefficients of a linear relationship between the first and second detectors, there is an error in the linear relationship based on the offset between the first and second detectors, and the correction factor reduces an effect of the error.

In an example embodiment having one or more features of the method of any of the previous paragraphs, the offset has an associated phase difference, the error is based the phase difference, and the correction factor corresponds to a value of the phase difference that minimizes the error.

An example embodiment having one or more features of the method of any of the previous paragraphs includes determining at least one value of the phase difference, determining when the at least one value minimizes the error, and determining the plurality of coefficients from the linear relationship including the at least one value that minimizes the error.

In an example embodiment having one or more features of the method of any of the previous paragraphs, the first direction is perpendicular to the second direction.

In an example embodiment having one or more features of the method of any of the previous paragraphs, the detectors each comprise an antenna.

In an example embodiment having one or more features of the method of any of the previous paragraphs, the detectors detect at least one of RADAR or LIDAR radiation.

Various features and advantages of at least one disclosed embodiment will become apparent to those skilled in the art from the following detailed description. The drawings that accompany the detailed description can be briefly described as follows.

DETAILED DESCRIPTION

Embodiments of this invention include detector devices that provide an ability to measure angles of detection in two dimensions or two directions. Such devices are useful for a variety of vehicle applications, such as detectors on automated vehicles or semi-autonomous vehicles. Such detectors are also useful for assisting drivers of automotive vehicles.

Figure 1:
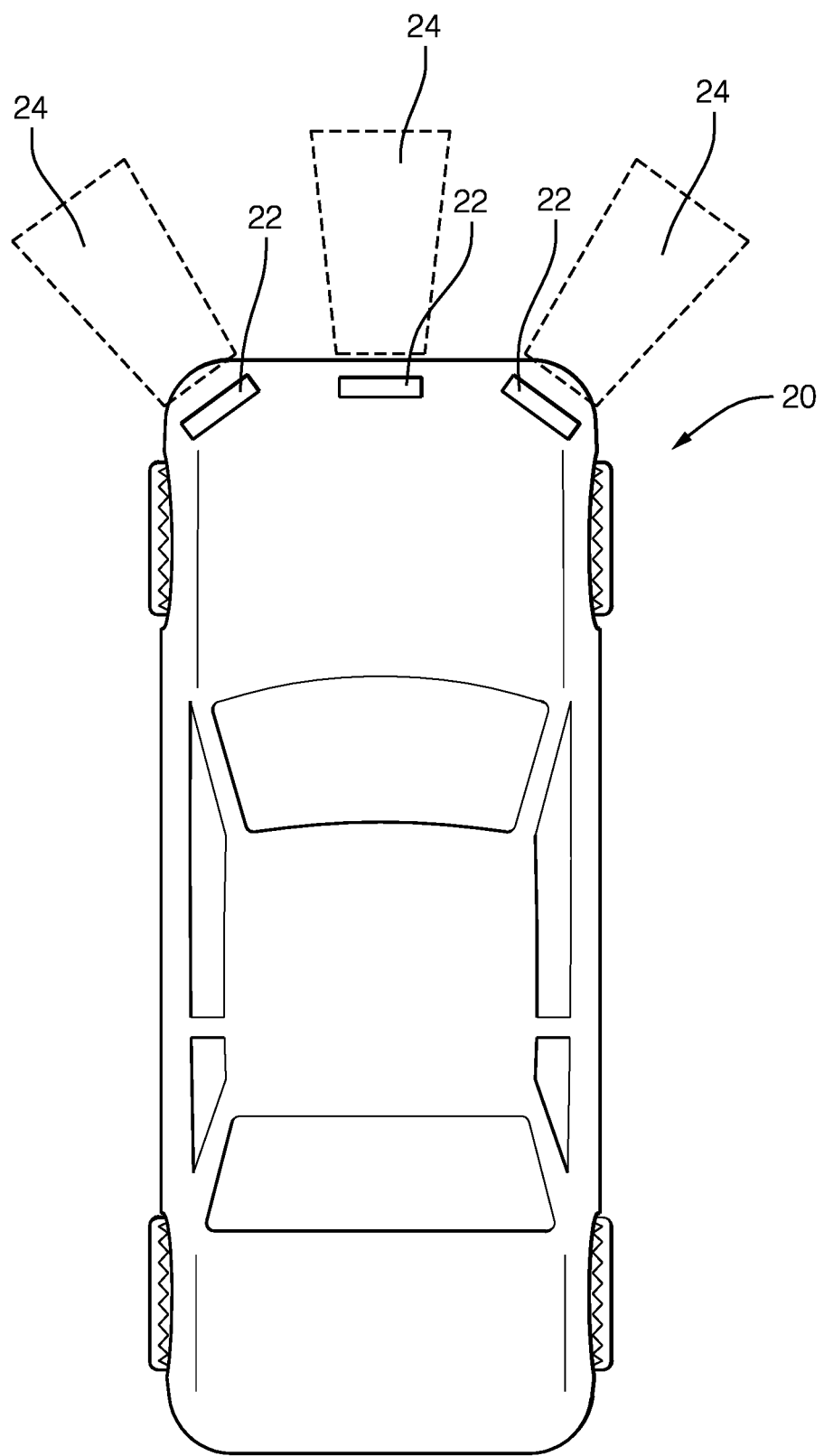
FIG. 1 schematically illustrates a vehicle including detector devices designed according to an embodiment of this invention.

FIG. 1 schematically illustrates an example vehicle 20 including a plurality of detector devices 22 that have associated fields of vision 24. In some examples, the detector devices 22 are capable of detecting RADAR radiation while in other examples, the detector devices 22 are capable of detecting LIDAR radiation.

Figure 2:
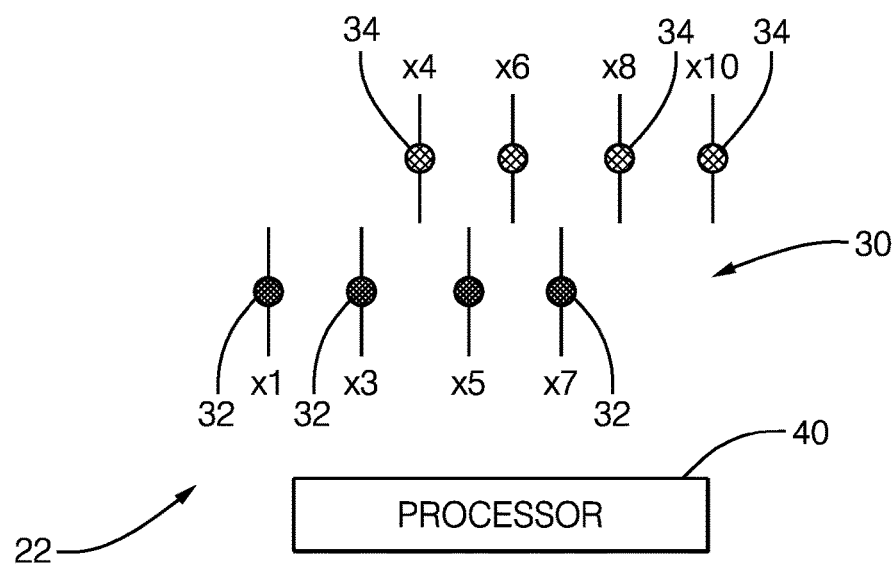
FIG. 2 schematically illustrates selected components of an example detector device designed according to an embodiment of this invention.

FIG. 2 schematically illustrates an example detector device configuration. A two-dimensional array 30 of detectors includes a plurality of first detectors 32 aligned with each other in a first direction (e.g., horizontal according to the drawing). The array 30 includes a plurality of second detectors 34 aligned with each other in the first direction. As can be appreciated from the illustration, the second detectors 34 are offset relative to the first detectors 32 in a second direction (e.g., vertically according to the drawing). The first and second directions are perpendicular in the illustrated example. In an example embodiment, each of the detectors 32 and each of the detectors 34 comprise an antenna.

Given that there is an offset between the first detectors 32 and the second detectors 34 in the second direction, a typical two-dimensional array approach will not provide accurate results when determining an angle of detection of the device 22. The illustrated example includes a processor 40 that is configured or programmed to determine an angle of detection of the device 22 in a manner that accommodates or compensates for the offset between the first detectors 32 and the second detectors 34.

The angle of detection in this example embodiment includes a first angle in a first dimension and a second angle in a second dimension that is transverse to the first dimension. For example, the first angle is an azimuth angle in a horizontal dimension and the second angle is an elevation angle in a vertical dimension As can be appreciated from FIG. 2, the second detector 34 labeled X4 is situated between the first detectors 32 labeled X3 and X5. The processor 40 is configured to determine an interpolation coefficient that is related to the offset between the first detectors 32 and the second detectors 34 and compensates for the shifted position of the second detector 34 labeled X4, for example, between the first detectors 32 labeled X3 and X5.

The shifted array structure provides better measurement in at least one dimension (e.g., horizontal) with a longer array size. At the same time, the illustrated example allows for determining an angle of detection in a second dimension (e.g., vertical) by correcting for the error otherwise introduced by the offset relationship between the detectors.

Figure 3:
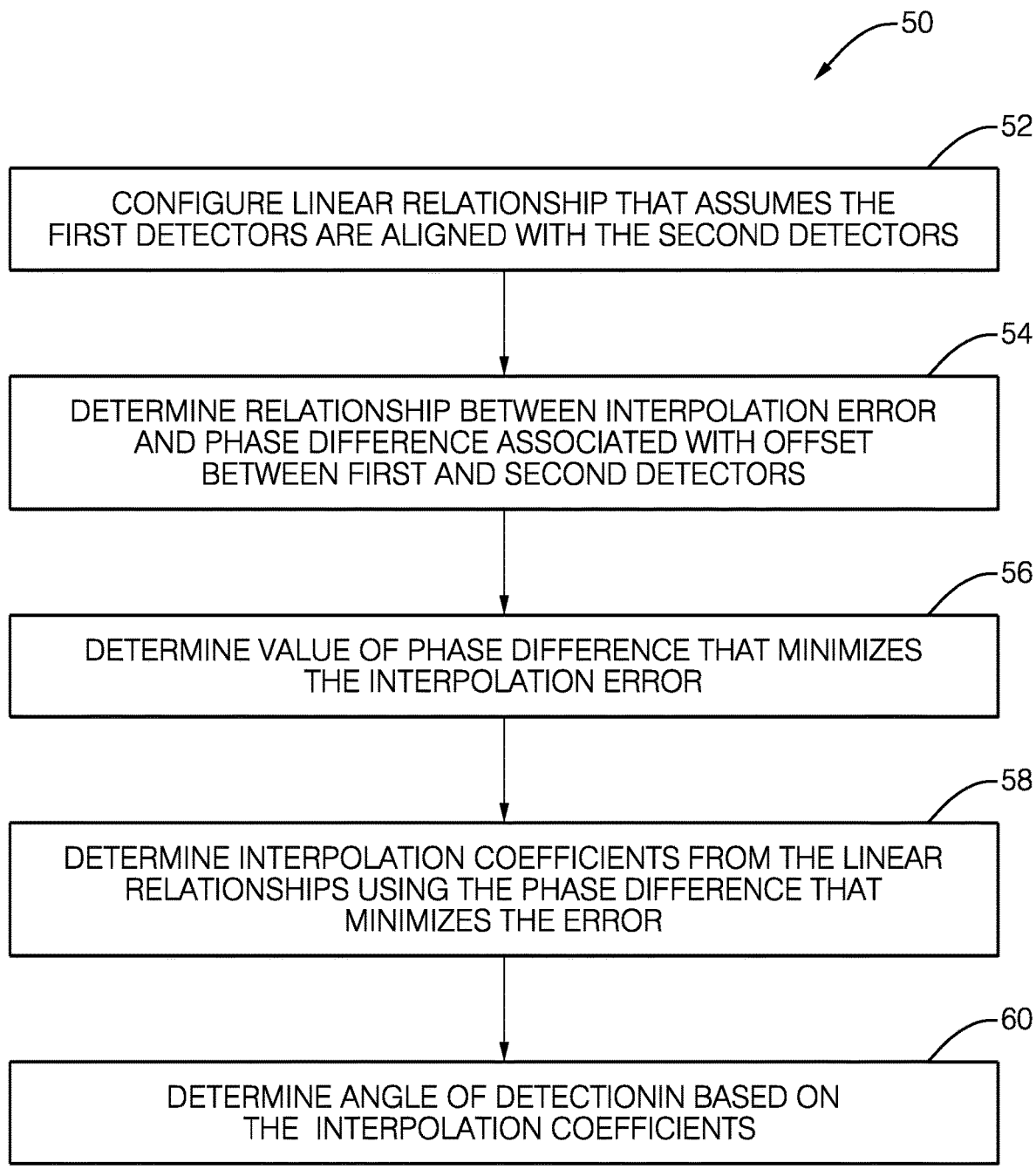
FIG. 3 is a flowchart diagram summarizing an example approach of determining an angle of detection according to an embodiment of this invention.

FIG. 3 is a flowchart diagram 50 that summarizes an example approach of determining an angle of detection with a shifted array structure such as that included in the example detector device 22 schematically shown in FIG. 2. At 52, a linear relationship is configured that assumes the first detectors 32 are aligned with the second detectors 34. At 54, a relationship is determined between an interpolation error, which is introduced by the offset between the second detectors 34 and the first detectors 32, and a phase difference associated with that offset. At 56, a value of the phase difference that minimizes the interpolation error is determined and that phase difference is used for determining the interpolation coefficients from the linear relationship at 58. At 60, the angle of detection is determined based on the interpolation coefficients, which relate the first detectors 32 and second detectors 34 as if they were in an aligned array structure rather than a shifted array structure. In other words, the interpolation coefficients are used to compensate for the offset between the first detectors 32 and the second detectors 34.

A particular implementation of the procedure summarized in FIG. 3 includes configuring or developing a linear model that compensates for the offsets between the first detectors 32 and the second detectors 34 and effectively collapses the array to a uniform, linear array. A linear relationship may be expressed using the following equation:

$$\begin{bmatrix} x_4 & x_6 \\ x_3 & x_5 \end{bmatrix} \cdot \begin{bmatrix} \alpha \\ \beta \end{bmatrix} = \begin{bmatrix} x_5 e^{j\theta} \\ x_4 e^{-j\theta} \end{bmatrix} \quad (1)$$

where $$c = [\alpha, \beta]^T$$

are linear interpolation coefficients and $\theta$ is the phase angle to effectively collapse the array. The phase angle corresponds to the difference in phase associated with the offset between the first detectors 32 and the second detectors 34.

Equation 1 above is true if there are less than two targets because only two coefficients are used in that linear relationship or model. Equation 1 is true based on the assumption that there is only one phase shift between the two transmits, which is good for a single target or two targets at the same elevation relative to the sensor device 22.

Equation 1 can be expanded to include all of the interpolation pairs in the array and the forward-backward array, which would make the solution more robust to noise. Expanding equation 1 in this manner yields $$\begin{bmatrix} x_4 & x_6 \\ x_6 & x_8 \\ \vdots & \vdots \\ x_3 & x_5 \\ x_5 & x_7 \end{bmatrix} \cdot \begin{bmatrix} \alpha \\ \beta \end{bmatrix} = \begin{bmatrix} x_5 e^{j\theta} \\ x_7 e^{j\theta} \\ \vdots \\ x_4 e^{-j\theta} \\ x_6 e^{-j\theta} \end{bmatrix} \quad (2)$$

that can be rewritten as $$Ac = b(\theta) = \begin{bmatrix} b_1 e^{j\theta} \\ b_2 e^{-j\theta} \end{bmatrix} \quad (3)$$

Because the interpolation coefficients $\alpha$, $\beta$ and the phase angle $\theta$ are unknown, it is possible to solve for the interpolation coefficients when the phase angle is known.

A least squares solution of the interpolation coefficients c is given by the pseudo-inverse as follows $$c = (A^H A)^{-1} A^H b(\theta) \quad (4)$$

From that equation, the interpolation error expressed in terms of $\theta$ can be represented by the following equation $$\epsilon^2 = [b(\theta) - Ac]^H (b(\theta) - Ac) \quad (5)$$

where $$b(\theta) - Ac = [I - A(A^H A)^{-1} A^H] b(\theta) = [I - P] b(\theta) = P^\perp b(\downarrow).$$

Considering P and $P^\perp$ as projectors ($P = P_H$ and $P \cdot P = P$), then Equation 5 can be further written as $$\epsilon^2 = b^H(\theta) P^\perp P^\perp b(\theta) = b^H(\theta) P^\perp b(\theta) \quad (6)$$

The projector $P^\perp$ may be partitioned as $$P^\perp = \begin{bmatrix} P_1 & P_2 \\ P_3 & P_4 \end{bmatrix}$$

Then Equation 6 can be written as $$\epsilon^2 = [b_1^H e^{-j\theta} \; b_2^H e^{j\theta}] \begin{bmatrix} P_1 & P_2 \\ P_3 & P_4 \end{bmatrix} \begin{bmatrix} b_1 e^{j\theta} \\ b_2 e^{-j\theta} \end{bmatrix} \quad (7)$$

$$= b_1^H P_1 b_1 + b_2^H P_3 b_1 e^{j2\theta} + b_1^H P_2 b_2 e^{-j2\theta} + b_2^H P_4 b_2$$

$$= \alpha + \beta e^{j2\theta} + \gamma e^{-j2\theta} + \delta$$

Taking the partial derivative of the interpolation error with respect to $\theta$ and setting it to 0 yields $$\frac{\partial \epsilon^2}{\partial \theta} = 2j \cdot e^{j2\theta} b_2^H P_3 b_1 - 2j \cdot e^{-j2\theta} b_1^H P_2 b_2 = 0 \quad (8)$$

then $$e^{j4\theta} = \frac{b_1^H P_2 b_2}{b_2^H P_3 b_1} = \frac{\gamma}{\beta} \quad (9)$$

It follows that $e^{j\theta}$ is the quadratic root of $\gamma/\beta$ and $$\theta = \operatorname{ang}(\gamma/\beta)/4 + 2k\pi$$

where k=0, 1, 2, 3 and $$\theta \in [-\pi, \pi].$$

There are four roots (i.e., quadratic) for the solution represented by Equation 9. According to one example embodiment, Equation 7 is solved for each root and the root that provides the smallest error and smallest angle is selected as the phase angle $\theta$. That selected phase angle may then be used to solve for the interpolation coefficients. The angle of detection of the detector device 22 can then be determined based on those interpolation coefficients.

The angle of detection in such an embodiment includes an azimuth angle determination and an elevation angle determination. The shifted array configuration allows for determining elevation while maintaining azimuth accuracy because it is not necessary to dedicate a channel or channels of a linear array to the elevation measurement, which would effectively shorten the array useable for the azimuth measurement.

Setting a correspondence between the error associated with the interpolation between the detectors and the phase difference between the levels in the elevation dimension allows for simultaneously determining the azimuth and elevation angles using the shifted array configuration. The linear interpolation between the detectors in the array assumes no shift is present. Estimating the elevation measurement includes correcting the error by assuming a model where a shift in elevation is present. A linear model as described above interpolates between adjacent ones of the first detectors 32, for example, at the same time as correcting the shift of the second detector 34 between those first detectors 32.

Figure 4:
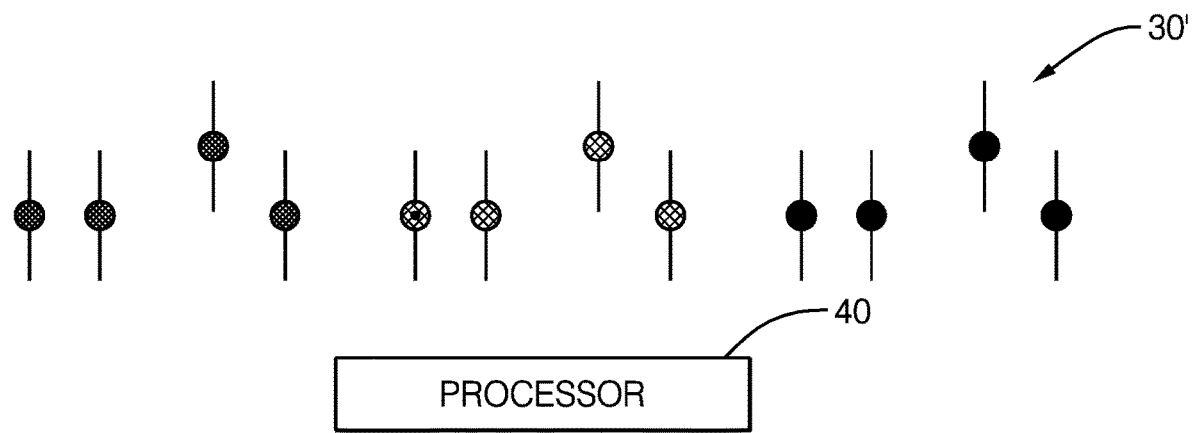
FIG. 4 schematically illustrates selected components of another example detector device designed according to an embodiment of this invention.

Another example sensor device configuration is shown in FIG. 4. This example includes different spacings between the detectors and some shifted detectors in the array 30'. For such an array configuration, Equation 3 above can be rewritten as:

$$Ac = b(\theta) = \begin{bmatrix} b_1 e^{j\theta} \\ b_2 e^{-j\theta} \\ b_3 \end{bmatrix} \quad (10)$$

The projector $P^\perp$ may be partitioned as:

$$P^\perp = \begin{bmatrix} P_1 & P_2 & P_5 \\ P_3 & P_4 & P_6 \\ P_7 & P_8 & P_9 \end{bmatrix}$$

and the interpolation error can be represented as $$\epsilon^2 = [b_1^H e^{-j\theta} \; b_2^H e^{j\theta} \; b_3^H] \begin{bmatrix} P_1 & P_2 & P_5 \\ P_3 & P_4 & P_6 \\ P_7 & P_8 & P_9 \end{bmatrix} \begin{bmatrix} b_1 e^{j\theta} \\ b_2 e^{-j\theta} \\ b_3 \end{bmatrix} \quad (11)$$

$$= b_1^H P_1 b_1 + b_2^H P_3 b_1 e^{j2\theta} + b_3^H P_7 b_1 e^{j\theta} + b_1^H P_2 b_2 e^{-j2\theta} +$$

$$b_2^H P_4 b_2 + b_3^H P_8 b_2 e^{-j\theta} + b_1^H P_5 b_3 e^{-j\theta} + b_2^H P_6 b_3 e^{j\theta} +$$

$$b_3^H P_9 b_3$$

After taking the partial derivative of the error with respect to $\theta$ and setting it to zero, the following is true $$\frac{\partial \epsilon^2}{\partial \theta} = 2j \cdot e^{j2\theta}b_2^H P_3 b_1 + j \cdot e^{j\theta}b_3^H P_7 b_1 - 2j \cdot e^{-j2\theta}b_1^H P_2 b_2 - \qquad (12)$$
$$j \cdot e^{-j\theta}b_3^H P_8 b_2 - j \cdot e^{-j\theta}b_1^H P_5 b_3 + j \cdot e^{j\theta}b_2^H P_5 b_3 = 0$$

Letting $z = e^{j\theta}$ in Equation 12 yields $$2b_2^H P_3 b_1 \cdot z^4 + (b_3^H P_7 b_1 + b_2^H P_6 b_3) \cdot z^3 - (b_3^H P_8 b_2 + b_1^H P_5 b_3) \cdot z - 2b_1^H P_2 b_2 = 0 \qquad (13)$$

Similar to the previous example, quadratic roots can be obtained by solving Equation 13 and θ=ang(z). Each of the four roots are used in Equation 11 and the one that minimizes the error and provides the smallest angle is chosen as the value of θ to solve for the interpolation coefficients. The smallest angle is useful in embodiments where the elevation field of vision is relatively small.

While each of the example embodiments discussed above have features that are attributed to the particular embodiment being discussed, those features are not limited to only that embodiment. Other embodiments are possible that include combinations of selected ones of the features of the disclosed embodiments.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A detector device, comprising:
   a multiple-dimensional array of detectors including a plurality of first detectors aligned with each other in a first direction and a plurality of second detectors aligned with each other in the first direction, the second detectors being offset relative to the first detectors in a second direction that is different than the first direction; and
   a processor that determines an interpolation coefficient related to the offset between the first and second detectors and determines an angle of detection of the device based on the interpolation coefficient.

2. The detector device of claim 1, wherein the angle of detection comprises a first angle in a first dimension and a second angle in a second dimension that is transverse with the first dimension.

3. The detector device of claim 2, wherein the first angle is an azimuth and the second angle is an elevation.

4. The detector device of claim 1, wherein the interpolation coefficient comprises a plurality of coefficients and a correction factor.

5. The detector device of claim 4, wherein
   the plurality of coefficients are coefficients of a linear relationship between the first and second detectors;
   there is an error in the linear relationship based on the offset between the first and second detectors; and
   the correction factor reduces an effect of the error.

6. The detector device of claim 5, wherein
   the offset has an associated phase difference;
   the error is based the phase difference; and
   the correction factor corresponds to a value of the phase difference that minimizes the error.

7. The detector device of claim 6, wherein the processor determines at least one value of the phase difference;
   determines when the at least one value minimizes the error; and
   determines the plurality of coefficients from the linear relationship including the at least one value that minimizes the error.

8. The detector device of claim 1, wherein the first direction is perpendicular to the second direction.

9. The detector device of claim 1, wherein the detectors each comprise an antenna.

10. The detector device of claim 1, wherein the detectors detect at least one of RADAR or LIDAR radiation.

11. A method of detecting, comprising:
    determining an interpolation coefficient related to an offset between first and second detectors, wherein the first and second detectors are in a multiple-dimensional array including the first detectors aligned with each other in a first direction and the second detectors aligned with each other in the first direction, and wherein the offset is between the first detectors and the second detectors in a second direction that is different than the first direction; and
    determining an angle of detection of the device using the determined interpolation coefficient.

12. The method of claim 11, wherein determining the angle of detection comprises
    determining a first angle in a first dimension; and
    determining a second angle in a second dimension that is transverse with the first dimension.

13. The method of claim 12, wherein the first angle is an azimuth and the second angle is an elevation.

14. The method of claim 11, wherein determining the interpolation coefficient comprises determining a plurality of coefficients and a correction factor.

15. The method of claim 14, wherein
    the plurality of coefficients are coefficients of a linear relationship between the first and second detectors;
    there is an error in the linear relationship based on the offset between the first and second detectors; and
    the correction factor reduces an effect of the error.

16. The method of claim 15, wherein
    the offset has an associated phase difference;
    the error is based the phase difference; and
    the correction factor corresponds to a value of the phase difference that minimizes the error.

17. The method of claim 16, comprising
    determining at least one value of the phase difference;
    determining when the at least one value minimizes the error; and
    determining the plurality of coefficients from the linear relationship including the at least one value that minimizes the error.

18. The method of claim 11, wherein the first direction is perpendicular to the second direction.

19. The method of claim 11, wherein the detectors each comprise an antenna.

20. The method of claim 11, wherein the detectors detect at least one of RADAR or LIDAR radiation.

21. A detector device, comprising:
    a processor in communication with a multiple-dimensional array of detectors;
        the multiple-dimensional array of detectors including a plurality of first detectors aligned with each other in a first direction and a plurality of second detectors aligned with each other in the first direction, the second detectors being offset relative to the first detectors in a second direction that is different than the first direction; wherein the processor determines an interpolation coefficient related to the offset between the first and second detectors.

22. The detector device of claim 21, wherein the processor further determines an angle of detection of the device based on the interpolation coefficient.

23. A method of detecting, comprising:
  determining an interpolation coefficient related to an offset between first and second detectors; wherein
  the first and second detectors are in a multiple-dimensional array including the first detectors aligned with each other in a first direction and the second detectors aligned with each other in the first direction; and wherein
  the offset is between the first detectors and the second detectors in a second direction that is different than the first direction.

24. The method of claim 23, further comprising the step of determining an angle of detection of the device using the determined interpolation coefficient.

* * * * *